US 6,223,773 B1

(12) United States Patent
Knoell et al.

(10) Patent No.: US 6,223,773 B1
(45) Date of Patent: *May 1, 2001

(54) CHECK VALVE ASSEMBLY

(75) Inventors: Burkhard Knoell, Lohr; Winfried Rueb, Neustadt, both of (DE)

(73) Assignee: Mannesmann Rexroth AG, Lohr (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/297,822

(22) PCT Filed: Oct. 20, 1997

(86) PCT No.: PCT/DE97/02422

§ 371 Date: May 19, 1999

§ 102(e) Date: May 19, 1999

(87) PCT Pub. No.: WO98/21486

PCT Pub. Date: May 22, 1998

(30) Foreign Application Priority Data

Nov. 11, 1996 (DE) .......................................... 296 22 693 U
Aug. 8, 1997 (DE) .............................................. 197 34 479

(51) Int. Cl.[7] ..................................................... F15B 13/04
(52) U.S. Cl. .......................... 137/596.15; 91/447; 91/455; 137/596.16; 137/596.2; 137/625.68
(58) Field of Search ............................. 91/446, 447, 455; 137/596.15, 596.16, 596.2, 625.68

(56) References Cited

U.S. PATENT DOCUMENTS

| 3,910,311 | * | 10/1975 | Wilke ..................................... 137/596 |
| 4,259,986 |   | 4/1981  | Maucher et al. . |
| 4,353,289 | * | 10/1982 | Lonnemo ............................ 91/455 X |
| 4,555,976 | * | 12/1985 | Wolfges .............................. 91/447 X |
| 5,913,333 | * | 6/1999  | Biener et al. .................. 137/596.2 X |

FOREIGN PATENT DOCUMENTS

| 22 11 404 | 9/1973 | (DE) . |
| 26 18 641 | 11/1977 | (DE) . |
| 27 05 303 | 8/1978 | (DE) . |
| 27 35 559 | 2/1979 | (DE) . |
| 32 47 420 | 7/1984 | (DE) . |
| 3247420 | * 7/1984 | (DE) ...................................... 91/447 |
| 33 19 810 | 10/1984 | (DE) . |
| 36 05 312 | 8/1986 | (DE) . |
| 39 41 802 | 6/1991 | (DE) . |
| 44 36 548 | 4/1996 | (DE) . |
| 197 07 722 | 5/1998 | (DE) . |
| 0 163 771 | * 12/1985 | (EP) ................................. 137/596.2 |
| 2 362 290 | 3/1978 | (FR) . |

OTHER PUBLICATIONS

Paro, J., "Rem en balanceerkleppen in hydraulische systemen," PT/WERKTUIGBOUW, vol. 42, No. 3, Mar. 1987, NL–RIJSWIJK, pp. 105–107.

* cited by examiner

Primary Examiner—Gerald A. Michalsky
(74) Attorney, Agent, or Firm—Oliff & Berridge, PLC (57) ABSTRACT

In a check valve assembly and a valve assembly employing such a check valve assembly, a topping piston may be taken into contact with a main poppet to raise the main poppet from its seat. The main poppet is designed without significant area difference from the valve seat and the topping piston is actuated through a pilot valve, so that the process of raising the main poppet from the valve seat is controllable.

20 Claims, 5 Drawing Sheets

CHECK VALVE ASSEMBLY

BACKGROUND OF THE INVENTION

The invention relates to a check valve assembly and a valve assembly containing a check valve assembly.

In mobile hydraulics, such valve assemblies are i.a. used for controlling double-action pressure cylinders, such as employed, e.g., as front power lifts or rear power lifts of farming tractors. By means of these power lifters it is possible to operate various peripheral tools such as, e.g., cutter bars, balers, ploughs, cultivators, rollers etc.

Under certain operating conditions, a situation may arise in which a load must be sustained in the lifted condition, where it is desired for this condition to be maintained even when the hydraulic supply is deactivated. Thus, for example, a cutter bar must be immobilised in the lifted condition while the farming tractor travels to the meadow to be mown or while it is parked in the farmyard.

Customarily the power lifters are controlled by means of proportional valves possessing a Zero position wherein the work conduits communicating with the power lifters and a pump conduit are shut off. Such proportional valves are, however, generally designed as sliding valves, so that the hydraulic fluid cannot be shut off leak-free in the work conduits. Consequently, piloted or releasable check valves are provided in the work conduits, whereby the hydraulic fluid may be confined leak-free between the user and the check valve. By releasing the check valve, a return flow of the hydraulic fluid to the proportional valve is enabled.

DE 27 35 559 C2 discloses a valve assembly wherein a main poppet may be controlled open for release with the aid of a topping piston. The main piston is designed with a pilot hole which is closed by a closing member. The latter may be taken into its opened position by controlling the topping piston through the intermediary of a tappet, so that the spring side of the main poppet is de-pressurised and the main poppet is controlled open by the load pressure applied to its differential surfaces. At the same time, the topping piston controls open a tank port, so that the hydraulic fluid may flow from the user past the raised main poppet to the tank T without requiring a return connection to a directional control valve arranged upstream of the check valve assembly. By the known combination of directional control valve and check valve assembly, merely a single-action lifting cylinder may be connected, the cylinder chamber of which may optionally be connected through the control valve to a pump or through the topping piston to the tank.

With the closing member in the raised condition, the main poppet is controlled open instantaneously due to its area difference, so that the hydraulic fluid is de-pressurised toward the tank comparatively rapidly, without a possibility of influencing the velocity of return flow.

In DE-44 36 548 A1 a valve assembly for controlling double-action lifting cylinders is disclosed, wherein a check valve assembly is arranged in every work conduit. The valve assembly in turn contains a main poppet designed with an area difference (i.e., the valve seat diameter is smaller than the effective external diameter of the main poppet), which may be controlled open by means of a topping piston. Due to this valve assembly it is possible to control a double action user, however, as the main poppet is again designed with an area difference, the main poppet immediately following rising from its valve seat is instantaneously set to its open position, so that a maximum cross section of flow is provided at once. In this known valve assembly, too, it is not possible to influence the return flow.

SUMMARY OF THE INVENTION

The invention is based on the object of furnishing a check valve assembly and a valve assembly including a like check valve assembly, whereby the return flow of the hydraulic fluid from the user may be controlled at minimum expense in terms of circuit technology.

This object is attained by a check valve assembly containing a main poppet biased against a valve seat, which may be raised from said valve seat by a topping piston in which the diameter of the valve seat is about equal to the diameter of the main poppet on the seat side. In the check valve assembly, the main poppet is designed to include a pilot hole and a pilot hole closing body, which may be moved into its opening position by the topping piston. The present invention is also directed to a valve assembly containing such a check valve.

By the measure of designing the main poppet without an area difference and determining the opening process through abutment of the topping piston, abrupt opening of the main poppet may be prevented. The opening stroke of the main poppet may then be influenced through suitable control of the topping piston, providing the possibility of controlling the volumetric flow of the returning hydraulic fluid (drain control).

The main poppet is generally biased against its valve seat by a spring. In the case of one embodiment of the invention, this spring acts as a check valve spring on the one hand to enable flow to the user, and as a control spring on the other hand in order to control return flow from the user to the tank in the released condition of the check valve. As a check valve spring, this spring should have a lower spring constant and a comparatively weak design in order to avoid high pressure losses by way of the check valve. As a control spring, in contrast, this spring should have a steeper characteristic curve in order to present good response characteristics in running control. As a rule, a compromise is realised to the effect that the spring is designed to have a comparatively high spring constant while accepting the higher pressure losses in the checking function. This drawback may be overcome by arranging, instead of a single spring, a check spring and a control spring in series, as it were, so that a check spring of a comparatively weak design determines the check function, with a control spring having a steeper spring characteristic taking effect only after a predetermined axial displacement of the main poppet in order to control the control pressure acting on the topping piston.

In an alternative embodiment having an advantageous construction, one end of the control spring is supported on a spring retainer integral with the housing and, following a predetermined stroke of the main poppet, taken into contact with an inner annular end surface of the main poppet, so that the further opening displacement of the latter takes place against the force of the control spring.

The spring side of the main poppet may be connected to the tank by means of a connecting bore in the topping piston. The latter is controlled open during the axial displacement of the topping piston, so that the spring chamber of the main poppet is de-pressurised toward the tank and may thus be raised more easily from its valve seat.

The structural length may be minimised if the main poppet is designed with a hub-shaped projection into which a tappet of the topping piston plunges such as to raise the closing member of the pilot hole. The annular end surface of the hub-shaped projection serves as a contact surface for the adjacent end surface of the topping piston. These contact surfaces are processed such that they sealingly contact each other, so that the inner cavity of the hub-shaped projection and the outer circumference of the main poppet are sealed from each other, so that pressure compensation cannot take place between the pressures prevailing at the valve seat and at the pilot hole in the open condition of the connecting bore.

As was already explained above, the topping piston contacts an annular end surface of the main poppet. By a radial expansion of the hub-shaped projection in the range of the annular end surface to a diameter greater than the diameter of the seat of the main poppet and a corresponding enlargement of the annular end surface, the topping piston and the main poppet are pressed against each other by the resulting pressure forces, so that a sealing contact of the topping piston and thus optimum drain control are ensured.

In order to enable fitting of the radially projecting portion of the hub-shaped projection, the main poppet is in this embodiment advantageously mounted in a bush screwed into the valve housing, the outer diameter of which is greater than the radially protruding portion of the hub-shaped projection.

Opening actuation of the tank port is effected, in addition to the connecting bore, by means of recesses through which a chamber downstream from the main poppet seat (when viewed in the return flow direction) may be connected to the tank.

Drain control is susceptible of particularly fine variation if the topping piston is piloted by means of a pilot valve.

In the starting position, a gap is formed between the opposing end surfaces of the main poppet and of the topping piston, which gap is larger than the distance between the tappet of the topping piston and the closing member. By this measure it is ensured that the closing member will be controlled open before the topping piston contacts the main poppet.

Inasmuch as a connection from the user to the tank may be established in the check valve assembly according to the invention, the control valves arranged in upstream positions for controlling the user may have a less complicated design as they are not necessary for establishing a connection to the tank.

The valve assemblies provided with a check valve assembly according to the invention are particularly advantageously utilised in controlling double-action cylinders, wherein a separate check valve assembly is allotted to each work conduit leading to the cylinder. These are each piloted through a pilot valve whereby a control side of the spool of the upstream directional control valve is also actuated in order to conduct the flow of hydraulic fluid to one of the cylinder chambers.

By energising one of the pilot valves, the spool is taken into a work position in which the hydraulic fluid is guided to the user by the a check valve assembly, while the displaced hydraulic fluid returns from the user to the other check valve assembly released by the control pressure of the pilot valve, so that the hydraulic fluid may flow to the tank via the check valve assembly.

The pilot valves used preferably are pressure reducing valves in cartridge design.

DETAILED DESCRIPTION OF PREFERRED EMBODIMENTS

Figure 1:
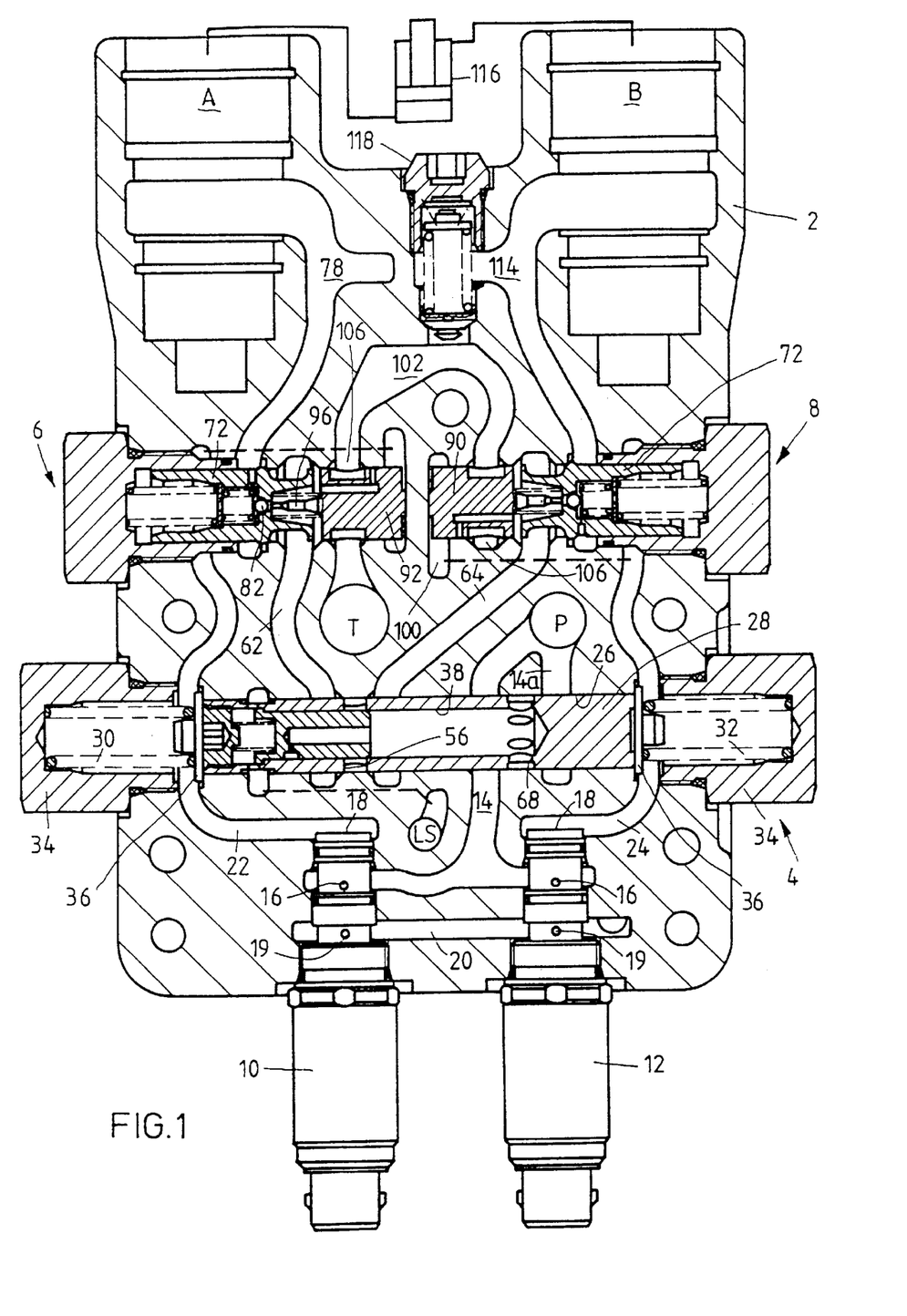
FIG. 1 shows a first embodiment of a valve assembly including a directional control valve and a check valve assembly which may be controlled through a pilot valve.

FIG. 1 shows a sectional view of a valve assembly in disk design. The valve disk or plate forms a valve housing 2 including receiving bores for a continuously adjustable directional control valve 4 and two check valve assemblies 6, 8.

The two check valve assemblies 6, 8 are arranged along a common axis which extends at a parallel distance from the axis of the directional control valve 4.

Into the valve housing 2 two pilot valves 10, 12 in cartridge design are moreover screwed, through which the directional control valve 4 and the two check valve assemblies 6, 8 may be controlled. These pilot valves 10, 12 are, for example, electrically actuated pressure reducing valves through which the pressure acting on a pump port P, which is guided via a pump passage 14 to radial ports 16 of the pilot valves 10, 12, may be reduced to a system pressure at the axial outlet port 18 of the respective pilot valve 10, 12. Each pilot valve 10, 12 moreover includes a radial port 19 opening into a tank passage 20 through which excess hydraulic fluid may be returned to a tank port T.

The outlet port 18 of each pilot valve 10, 12 opens into a control passage 22 or 24, respectively, which open into a valve bore 26 wherein a spool 28 of the directional control valve 4 is guided. The two control passages 22, 24 open onto either side of the spool end sides, so that the latter receive the pressure in the respective control passage 22, 24, i.e., the output pressure from the pilot valve 10 or 12, respectively.

The spool 28 is moreover biased into its represented Zero position by two pressure springs 30, 32 acting on the end surfaces. The valve springs are supported at the internal bores of closure caps 34 screwed into the valve housing 2 to thus form the axial termination of the valve bore 26. The other end of the pressure springs 32, 34 contacts a respective spring retainer 36 which is supported by a circumferential portion at a housing shoulder in the represented Zero position.

Construction details of the directional control valve 4 and of a check valve assembly 6 shall hereinbelow explained by referring to FIG. 2 which shows an enlarged representation of these components.

Figure 2:
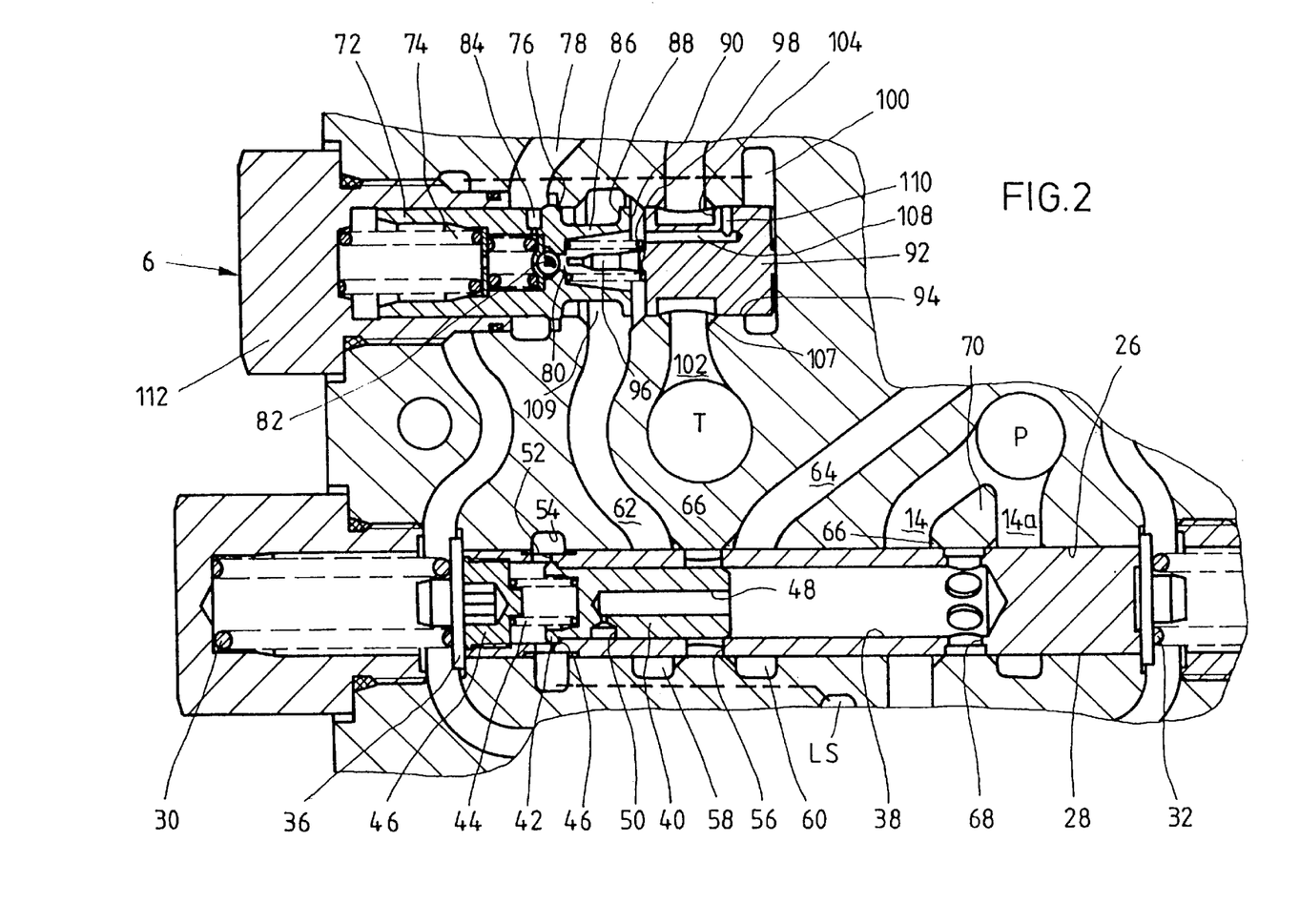
FIG. 2 is a detailed representation of the directional control valve and of a check valve assembly of FIG. 1.

In the left-hand end portion of the spool 28 in accordance with FIG. 2, a pocket-hole type internal bore 38 is provided wherein a pressure compensator piston 40—is guided in axial translation. In the Zero position shown in FIG. 2, the pressure compensator piston 40—hereinafter referred to as piston 40—contacts a shoulder 46 of the internal bore 38 with a radial collar 42. The piston 40 is biased in the direction toward this contact position by means of a control spring 44. The control spring 44, in turn, is supported on a terminating screw 46 screwed into the annular jacket of the spool 28 and forming the contact surface for the spring retainer 36 (on the left in FIG. 2) jointly with the end face of the annular jacket. The piston 40 includes a connecting bore with an axial pocket hole bore and a radial throttle bore opening at the outer circumference of the piston 40.

In the range of the radial collar 42, a compensating bore 52 is formed in the annular jacket of the spool 28, with this compensating bore opening into an annular control chamber 54 connected to a control port LS via a conduit indicated by a dashed line, so that a control pressure corresponding to the load pressure may be applied in the spring chamber.

In the central region of the spool 28, an outlet bore star 56 is formed to which two annular chambers 58 and 60 connected to the connecting passages 62 and 64, respectively, are associated. These connecting passages 62, 64 lead to inlet ports of the check valve assemblies 6 and 8, respectively. The annular chambers 58, 60 are provided with chamfers 66 which, upon axial displacement of the spool 28, enable fine opening control of the outlet bore star 56. The axial length of the piston 40 is selected such that in the Zero position (FIG. 2) the outlet bore star 56 is closed by the right-hand end portion of the piston 40. The radial throttle bore 50 is then closed by the inner peripheral wall of the internal bore 38.

In the range of the internal end portions of the internal bore 38 there opens an inlet bore star 68 closed in the Zero position by a web 70 formed between the pump passage 14 and a pump branch passage 14a. The two pump passages 14, 14a approximately extend in a radial direction with respect to the valve bore 26. The internal bore 38, in turn, is provided with chamfers 66 for fine control in the range of the web 70.

The inlet bore star 68 and the pump passages 14, 14a including the corresponding annular chambers form an adjustable metering orifice, whereas the piston 40 and the outlet bore star 56 form a metering throttle whereby the system pressure downstream from the metering orifice is throttled to the load pressure in the connecting passages 62 and 64. Serial arrangement of metering orifice and metering throttle ensures that the pressure drop across the metering orifice (inlet bore star 68) will remain constant independent of the pressure in the connecting passages 62, 64.

As was already mentioned above, the spring chambers of the pressure springs 30, 32 are connected to the respective control passages 22 and 24, so that the control pressure prevails at the end surfaces.

The two check valve assemblies 6, 8 have an identical construction, so that for the purpose of simplicity only the check valve assembly 6 represented in FIG. 2 shall be described. The latter includes a main poppet 72 urged against a valve seat 76 by a check spring 74 including a conical section, so that in this closing position the connection from the connecting passage 62 to a work passage 78 is interrupted.

In the shown embodiment the main poppet 72 is designed to include a pilot hole 80 closed by a ball 82 which is pressed against a pilot hole seat by the check spring 74 and a spring retainer. The spring chamber of the check spring 74 presents the opening of a throttle bore 84 which, in turn, opens into the work passage 78. At the right-hand end portion in accordance with FIG. 2, a hub-shaped projection 86 is formed, at the outer circumference of which an annular groove 88 is provided. The internal bore of the hub-shaped projection 86 extends in conical configuration toward the pilot hole 80.

The annular end surface 90 of the projection 86 serves as a contact surface for a topping piston 92 guided coaxially with the main poppet 72 in a receiving bore 94. At its end portion adjacent the main poppet 72, the topping piston 92 includes a tappet 96 which plunges into the internal bore of the hub-shaped projection 86 and the end portion of which has a smaller diameter than the pilot hole 80, so that the tappet 96 may also plunge into this pilot hole 80. The topping piston 92 is biased against the end surface of an annular chamber 100 of the receiving bore 94 by means of a spring 98. In this stop position, a predetermined gap exists between the annular end surface 90 and the adjacent end surface of the topping piston 92 which is greater than the distance from the end portions of the tappet 96 to the outer circumference of the ball 82.

At the outer circumference of the topping piston 92, in the range of a tank passage 102 opening into the receiving bore 94, several recesses 104 distributed over the circumference are formed, whereby in the event of an axial displacement of the topping piston 92 the tank passage 102 may be connected to the work passage 62 which opens into the receiving bore 94 via an annular chamber 109.

Inside the topping piston 92, there is moreover formed a relief bore, the axial portion 108 of which opens into the left-hand end surface in accordance with FIG. 2, and via a radial portion 110 opens between the annular chamber 106 of the tank passage 102 and the annular chamber 100 (basic position). The annular chamber 106 of the tank passage 102, in turn, is provided with fine control chamfers 107. The axial portion 108 radially opens within the annular end surface in the internal bore of the projections 86.

As can further be learned from FIG. 2, the left-hand portion of the main poppet 72 is guided in the internal bore of a closure plug 112 screwed into the left-hand end portion of the receiving bore for the check valve. The control passage 22 is extended from the left-hand end surface of the spool 28 as far as into the range of the closure plug 112 and from there—as is indicated in phantom line—to the annular chamber 100, so that in the latter the control pressure applied by the pilot valve 10 and acting on the topping piston 92 opposite to the force of the spring 98 may be adjusted.

As can be learned from FIG. 1, the tank passage 102 leads to the annular chamber 106 of the (right-hand) check valve assembly 8, and the annular chamber 100 is connected to the control passage 24 via the passage indicated by a dashed line, so that the topping piston 92 of the check valve assembly 8 receives the control pressure applied by the pilot valve 12 in a direction toward the main poppet 72, whereas the topping piston 92 of the check valve assembly 6 is controlled by the pilot valve 10.

In the raised condition of the main poppet 72 of the check valve assembly 8, a connection with a work passage 114 is controlled open, which work passage leads to a work port B of the valve assembly. The work passage 78 of the check valve assembly 6 leads to a work port A. The two ports A, B may be connected to a user, for example the cylinder chamber or annular chamber of a lifting cylinder 116. Connection may be effected, e.g., by means of hose couplings.

Between the tank passage 102 and the work passage 114, a connecting passage is provided in which a conventional check valve 118 is arranged, this check valve enabling a flow from the tank passage 102 to the work passage 114 in the event of excess pressure build-up in the tank T, however preventing reverse flow through it.

Figure 3:
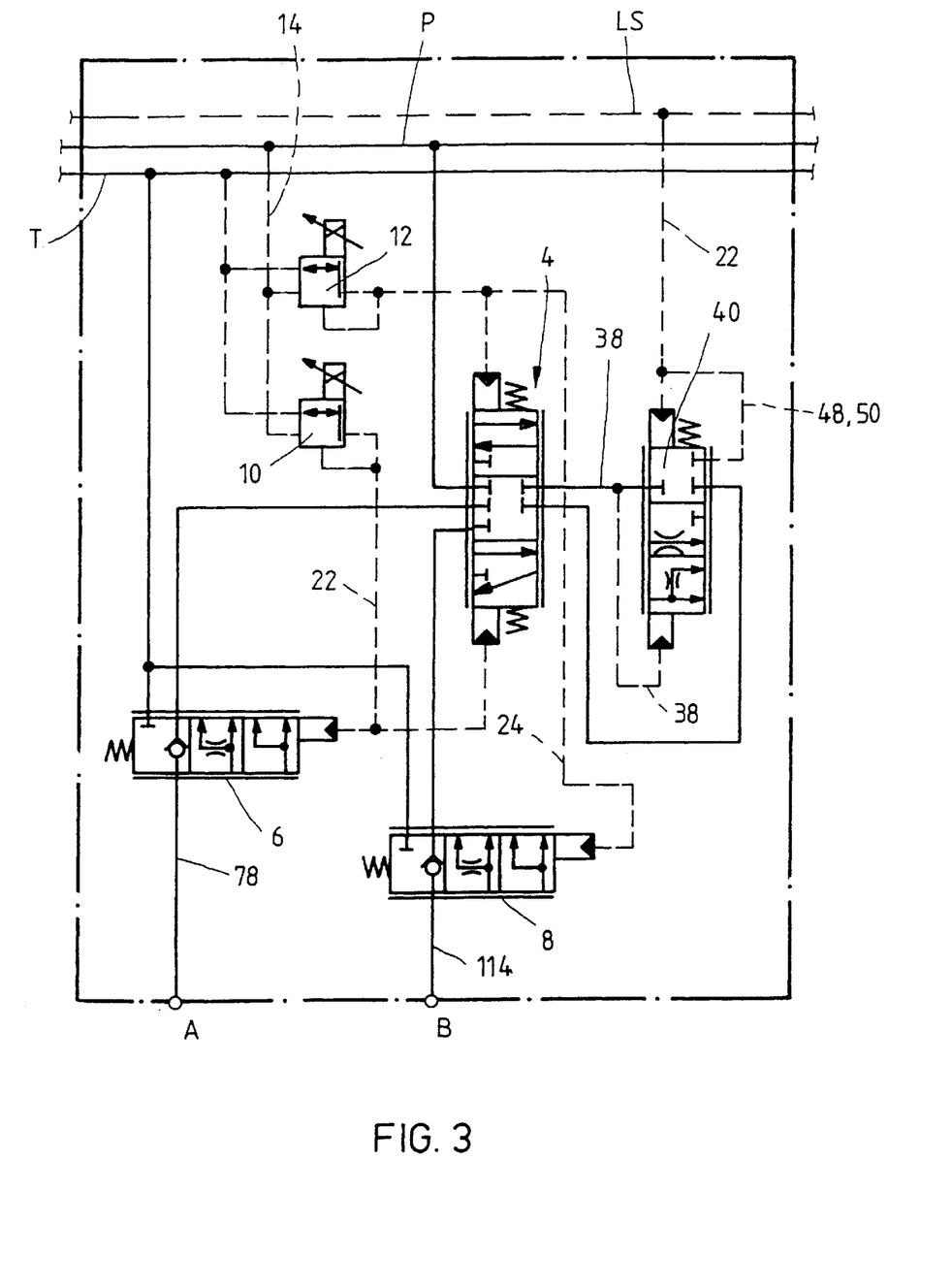
FIG. 3 is a schematic circuit diagram of the valve assembly of FIG. 1.

FIG. 3 shows a schematic hydraulic circuit diagram of the valve assembly in accordance with FIG. 1. Accordingly, the control sides of the directional control valves 4 are actuated through the two pilot valves 10, 12 having furthermore associated respective check valve assemblies 6 and 8 which receive the control pressure corresponding to the load pressure on their control sides. Downstream from the metering orifice of the directional control valves 4, the pressure compensator including the pressure compensator piston 40 is arranged whereby the pressure drop across the metering orifice is maintained constant independent of the load pressure. The pressure compensator is acted on in the closing direction by the control spring 44 at the control port LS and receives the pressure downstream from the metering orifice (directional control valve 4) in the opening direction. As a result of corresponding control of the pilot valves 10, 12 and the ensuing translation of the spool of the directional control valve 4 and of the check valve assemblies 6, 8, one of the work ports is supplied with hydraulic fluid—as will be explained in detail herebelow—whereas the other work port is connected to the tank T via the valve assembly. If the load pressure downstream from the directional control valve 4 is higher than the load pressure at the control port LS, the pressure compensator is shifted into the upper position in accordance with FIG. 3, so that this higher load pressure is fed into the load indicating conduit.

The function of the valve assembly represented in FIGS. 1 to 3 shall now be explained in brief.

In order to move the lifting cylinder 116 outward, the cylinder chamber must be supplied with hydraulic fluid via work port A. To this end, the pilot valve 12 is energised, so that a control pressure corresponding to the output pressure of the pilot valve 12 acts on the right-hand end surface of the spool 28 in accordance with FIG. 1. Owing to this control pressure, the spool 28 is displaced toward the left against the tension of the pressure spring 30, so that the inlet bore star 68 is controlled open and hydraulic fluid from the pump passage 14 may enter into the internal bore 38. By the pump pressure the piston 40 is raised from its stop position, so that the outlet bore star 56 is controlled open against the force of the control spring 44 and against the load pressure until equilibrium is established between the piston spring side and the front side (on the right in FIG. 1). The hydraulic fluid may now enter from the internal bore 38 through the opened outlet bore star 56 into the connecting passage 62, so that the main poppet 72 is acted upon in the opening direction, i.e., against the force of the check spring 74. In the case of sufficient pump pressure—more precisely: output pressure at the pressure compensator—the main poppet 72 is raised from its valve seat, so that the hydraulic fluid may flow through the work passage 78 to port A and from there into the cylinder chamber of the lifting cylinder 116.

Owing to the pressure build-up in the cylinder chamber, hydraulic fluid is displaced from the annular chamber of the lifting cylinder 116 and guided via port B and the work passage 114 to the check valve assembly 8.

The control pressure generated upon energisation of the pilot valve 12 also prevails in the annular chamber 100 and thus at the back side of the topping piston 92, so that the latter is moved against the force of the spring 98 (FIG. 2) to the right in the representation of FIG. 1.

Following a predetermined stroke, the tappet 96 of the topping piston 92 enters into contact with the ball 82 which is thereby raised from its seat against the bias of the check spring 74. The main poppet 72 still is in contact with its seat. As a result of the axial displacement of the topping piston 92, the radial portion 110 of the compensating bore is controlled open by the control land of the annular chamber 106, so that the tank pressure prevails in the compensating bore and in the bore of the projection 86.

Inasmuch as the throttle bore 84 presents a substantially smaller diameter than the pilot hole 80, the pressure in the spring chamber of the check spring 74 diminishes because hydraulic fluid cannot follow suit quickly enough in flowing from the work passage 114 through the small-sized throttle bore 84. As a result, the spring side of the main poppet 72 is de-pressurised. Owing to the effect of the control pressure, the topping piston 92 in the opened condition of the ball 82 is moved into its stop position relative to the projection of the main poppet 72, so that the latter is drivingly engaged by the topping piston 92 and raised from its valve seat. In this stop position, the end surface of the topping piston 92 and the annular end surface 90 of the main poppet 72 sealingly contact each other, so that the internal bore of the projection 86 is sealed from the outer circumference. By the axial displacement of the topping piston 92 and of the main poppet 72 contacting it, a connection from the work passage 114 is established via the annular groove 88 to the annular chamber 109 which, in turn, is connected via the recesses 104 to the tank passage 102, with the latter connection being controlled open by way of the recesses 104. The hydraulic fluid may now return from the work passage 114 into the tank passage 102 and thus to the tank port T.

Outward movement of the lifting cylinder 116 is terminated by de-energising the pilot valve 12, so that both main poppets 72 of the check valve assembly 6, 8 may again be returned into their closing positions and the hydraulic fluid is confined leak-free between the check valve assemblies 6, 8 and the lifting cylinder 116.

For the purpose of retracting the lifting cylinder 116, the pilot valve 10 is energised in the opposite manner, so that the spool 28 is moved to the right and the annular chamber of the lifting cylinder 116 is supplied with hydraulic fluid through port B, whereas the hydraulic fluid in the cylinder chamber is returned to the tank T via the work port A and the released check valve assembly 6.

The valve assembly according to the invention enables adjustment of a float position without the directional control valve having to be designed to include a so-called fourth switching position, i.e., a terminal switching position, which must be provided in the prior art on top of the Zero position and the multiplicity of work positions.

In the valve assembly according to the invention, both pilot valves 10, 12 are energised in order to set the floating position, i.e., in order to connect the work ports A and B to the tank T, so that an identical control pressure is present on both control sides of the spool 28 and the latter is biased into its Zero position.

Hydraulic fluid is not supplied from the pump port P to the check valve assemblies 6, 8. The control pressure in the control passages 22 and 24 acts on both topping pistons 92 in the opening directions thereof, so that the main piston 72 is raised from its valve seat in the above described manner, and the connection between the work passages 78 and 114 and the tank passage 102 is opened.

The lifting cylinder can now be moved "manually" inasmuch as the hydraulic fluid may circulate practically without resistance.

In the above described constructions of check valve assemblies 6, 8 there was a possibility under certain operating conditions of the load pressure prevailing at one of the ports A, B having pushed apart the topping piston 92 and the main poppet 72, so that regular drain control was not possible. The reason for this was that, if topping piston 92 and main poppet 72 contact each other in the seal gap between the annular surface 90 of the main poppet 72 and the contact surface at the topping piston 92, a pressure may build up which drops from radially outside to radially inside from the load pressure to the tank pressure prevailing in the chamber accommodating the spring 98. The resulting intermediate pressure acting on the annular end surface 90 may under particular operating conditions be as great as to neutralise the sealing contact between main poppet 72 and topping piston 92 against the force acting on the rear side of the topping piston.

In order to eliminate this drawback, a modified check valve assembly 6, 8 is used in the embodiment represented in FIG. 4, wherein inadvertent raising of the topping piston 92 from the main poppet 72 may be prevented by a geometrical design described in more detail hereinbelow.

The construction principle of the second embodiment of the valve assembly fundamentally corresponds to the one described in connection with FIG. 1. I.e., two pilot valves 10, 12 are screwed into the valve housing 2, whereby the directional control valve 4 and the two check valve assemblies 6, 8 may be actuated in the above described manner in order to control supply to, and return flow from, the work ports A, B. The valve housing 2 is moreover designed with a tank port T, a pump port P and a control oil port LS. Apart from the construction of the check valve assemblies 6, 8, the valve assembly represented in FIG. 4 conforms with the one of FIG. 1, so that only the particularities of the check valve assemblies 6, 8 shall be discussed hereinbelow.

Figure 4:
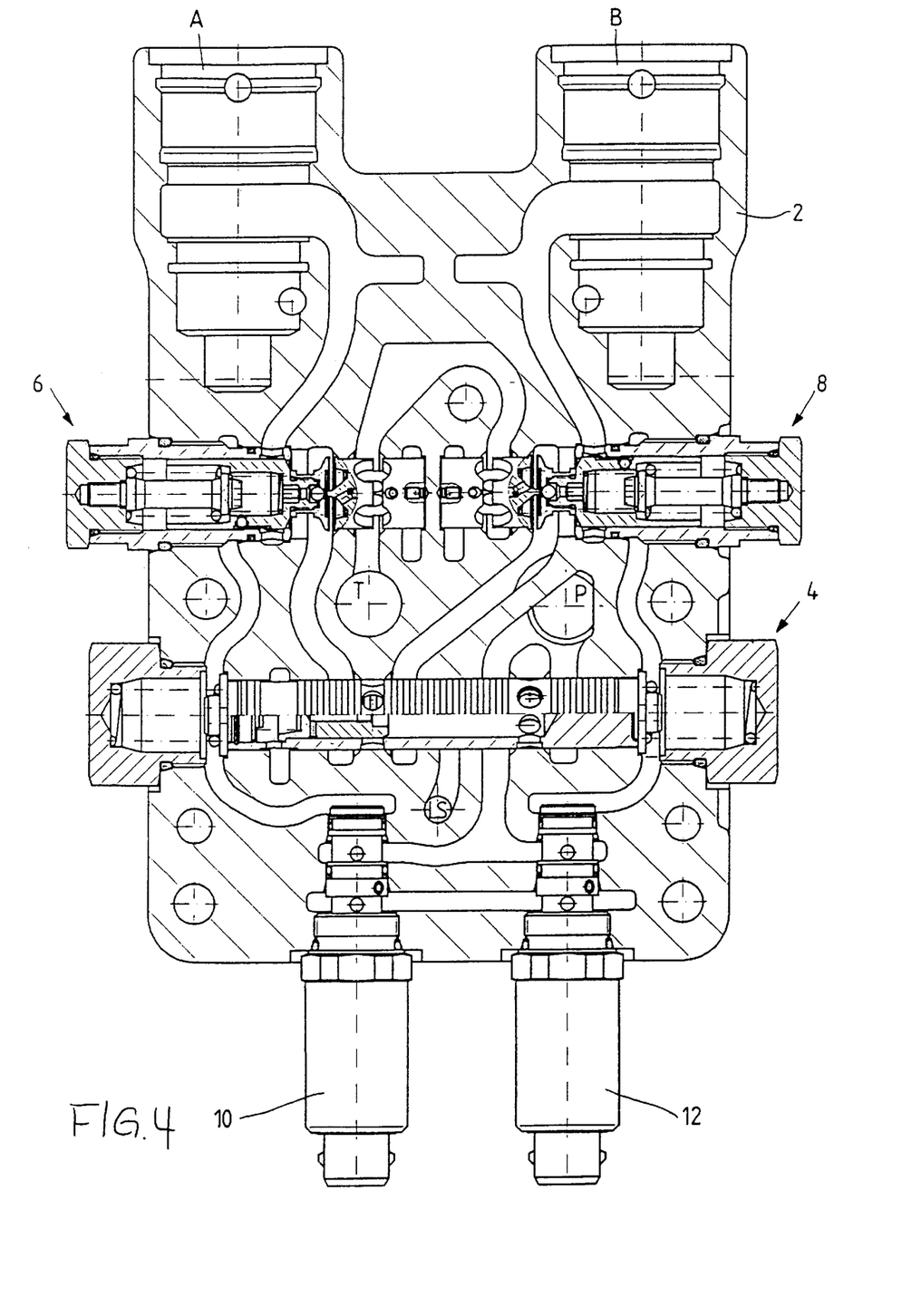
FIG. 4 shows a second embodiment of a valve assembly.
Figure 5:
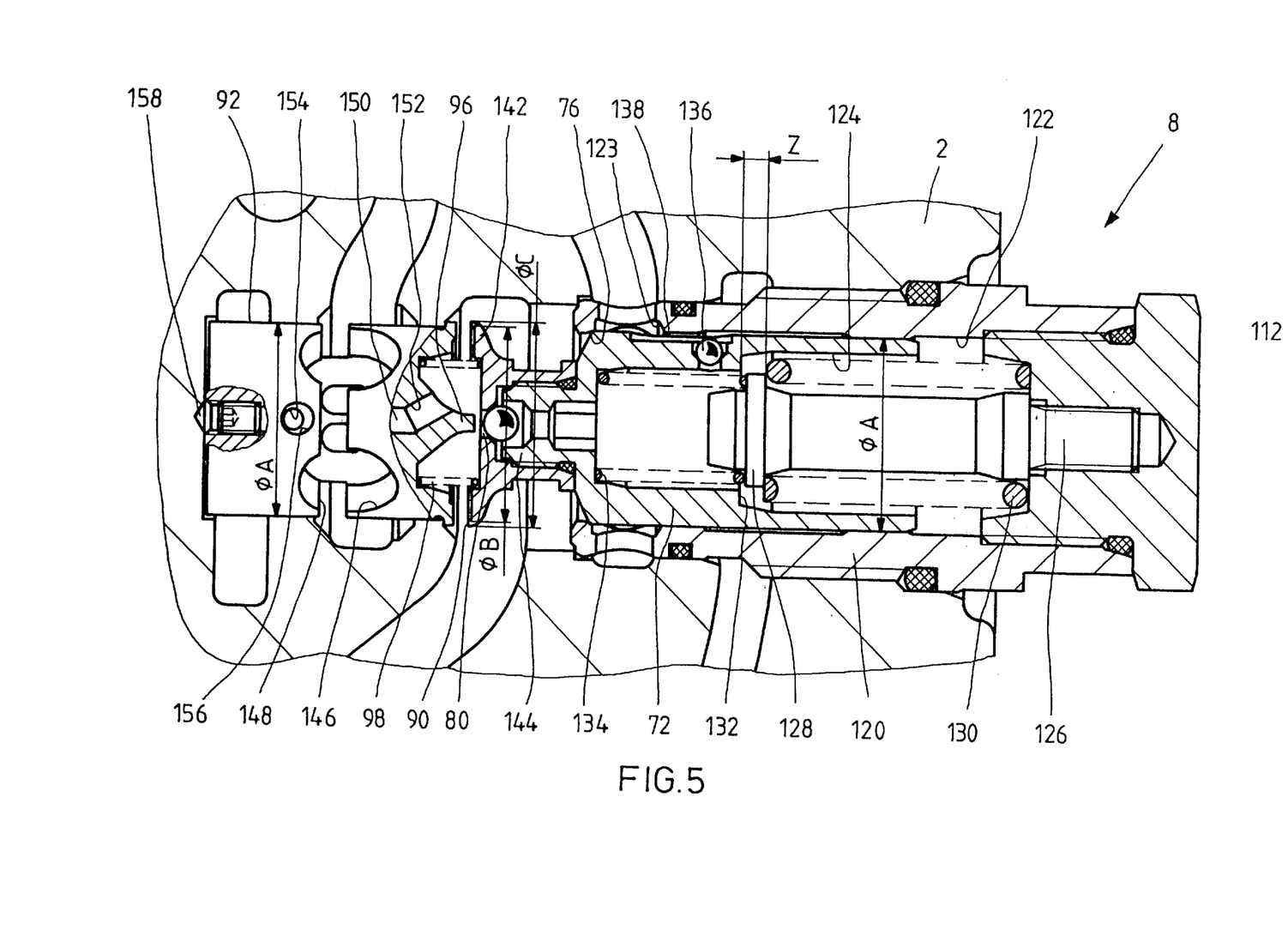
FIG. 5 shows a check valve assembly 8 of the valve assembly of FIG. 4.

FIG. 5 shows the check valve assembly 8 arranged on the right side of FIG. 4 in an enlarged representation. In the following, the same reference symbols as for the embodiment of FIG. 2 shall be used for corresponding components.

In the embodiment represented on the right side of FIG. 5, the main poppet 72 is guided not directly in the valve housing 2 but in a bush 120 screwed into a corresponding receiving bore of the valve housing 2. In an internal bore 122 of the bush 120 the valve seat 76 for the main poppet 72 is formed. The diameter of the valve seat 76 is designated by A. In the range of the valve seat 76 a radial bore 123 is formed in the bush wall, through which the passage leading to the port B may be supplied with the pressurised hydraulic fluid in the raised condition of the main poppet 72.

The closure plug 112 which carries a supporting pin 126 projecting into an axial bore 124 of the cup-shaped main poppet 72 is screwed into the right-hand end portion of the bush 120 in the representation of FIG. 5. The latter comprises at its main poppet side end portion a spring retainer 128 contacted by an end portion of a control spring 130, the other end of which is supported against the end surface of the closure plug 112. The outer diameter of the control spring is selected to be somewhat greater than the one of the spring retainer 128, so that the control spring 130 radially projects over the spring retainer 128. In the represented basic position, i.e., when the main poppet 72 is closed, a radial shoulder 132 is formed at an axial distance Z from the contact surface of the spring retainer 128 in the axial bore 122, whereby the main poppet 72 may be taken into contact with the control spring 130 following an opening displacement by the amount Z, so that the further opening displacement takes place against the force of the control spring 130.

Against the end surface removed from the control spring 130 of the spring retainer 128 a check spring 134 is supported which acts on the bottom side of the main poppet 72 to bias it against the valve seat 76. The check spring 134 is designed with a flat spring characteristic, while the control spring 130 is designed with a steep spring characteristic.

In the annular jacket of the main poppet 72 a radial bore is formed which is closed by a check valve member 136 enabling a flow of fluid from the main poppet inner cavity to the bush radial bore 123. The outer circumference of the main poppet 72 is stepped back somewhat in the range of the check valve member 136, resulting in the formation of a throttle gap 138.

In the embodiment represented in FIG. 2, the hub-shaped projection 86 was designed integral with the main poppet 72. In the embodiment represented in FIG. 5, a contact portion 142 is screwed onto an axial projection 144 of the main poppet 72, with the annular end surface 90 sealingly contacting the topping piston 92 being formed at the end surface of the contact portion 42. The latter radially expands toward its end surface, so that the inner diameter of the annular end surface 90 presents a size B which is greater than the seat diameter A. Correspondingly the outer diameter C is, of course, also greater than the seat diameter A. In simple words, in the range of its end surface the contact portion 142 is enlarged in the radial direction beyond the diameter of the main poppet 72.

The contact portion 142 includes an axial bore forming the pilot hole 80 which may—as described for the preceding embodiment—be closed by means of a pilot ball 80 permitting a flow of hydraulic oil into the spring chamber of the main poppet 72, however precluding a reverse flow. In the embodiment represented in FIG. 5, the ball 80 is biased toward the valve seat in the pilot hole 80 not by spring bias but only hydraulically. The connection between the pilot hole 80 and the spring chamber of the main poppets 72 is realised through an axial bore in the axial projection 144.

The ball 80 may be raised from pilot hole seat by the tappet 96 of the topping piston 92. The topping piston 92 is biased into the represented basic position by means of the spring 98.

In the embodiment described in FIG. 2, the drained hydraulic fluid is free to flow to the tank port T via flat recesses 104 at the outer circumference of the topping piston 92 when the main poppet 72 is opened.

In order to increase the cross section of flow and thus minimise the energy loss, the flat recesses 104 are in the shown embodiment replaced with radial recesses 146 having a comparatively large cross section and interconnected by a circular annular groove 148. Owing to this design, the flow resistance during draining is reduced substantially.

The pressure in the spring chamber of the main poppet 72 is de-pressurised toward the tank T via a central relief bore 150 when the ball 80 is raised, with the said relief bore communicating with the range of the tappet 96 through an oblique bore 152 on the one hand, and on the other hand extending as far as to one or several transverse bores 154 extending externally of the radial recesses 146 and communicating with elongate grooves 156 or other recesses at the outer circumference of the topping piston 92. By the axial displacement of the topping piston 92 the grooves 156 are controlled open, so that the spring chamber of the main poppet 72 may be de-pressurised.

By the radial expansion of the contact portion 142 beyond the seat diameter A, the main poppet 72 during drain control as a general rule receives the resulting fluid pressure in the direction of its contact position at the topping piston 92, so that these components cannot move apart like, for example, in the above described embodiment. Due to the large diameter of the topping piston 72 and of the contact portion 142, the valve seat 76 must be formed in the bush 120 because the topping piston 72 might otherwise not be mounted from the righthand side. In the shown embodiment, the topping piston 72 is pre-installed in the bush 120 and then screwed into the valve housing 2.

By the geometrical design of a contact portion of the main poppet 72 at the topping piston 92 it is ensured that within the diameter A no pressure is present which might push the topping piston 92 and the main poppet 72 apart. The load pressure at the port B in this variant even urges the topping piston 92 and the main poppet 72 together because the resulting pressure at the annular surfaces between the diameters C and A acts in the "holding together" direction. In the "pushing apart" direction, a pressure which drops from diameter C toward the diameter B from the load pressure to tank pressure acts between the diameters C and B in the seal surface.

At the back side of the topping piston 92 (left side in FIG. 5) a stop member 158 is formed which has the effect that the end surface of the topping piston 92 will generally be arranged at a smaller distance from the valve housing end surface.

In the check function, the main poppet 72 is raised from the valve seat 76 against the force of the weak check spring 134, so that the work port B may be supplied with to hydraulic fluid. The distance z is selected such that the control spring 130 does not become effective in the check function.

During drain control, a control pressure is applied to the back side of the topping piston 92, whereby it is moved to the right in the representation of FIG. 5, and the ball 80 is raised from its pilot hole seat. The spring chamber of the main poppet 72 may then be depressurised toward the tank T via the oblique bore 152, the relief bore 150, the transverse bore 154 and the groove 156 while the check valve member 136 is closed.

Subsequently the topping piston 92 enters into contact with the main poppet 72, so that these two components sealingly contact each other. The de-pressurised main poppet 72 is then raised from its valve seat 76, with this raising movement initially taking place against the force of the weak check spring 134. In this operating condition the connection to the tank port T via the recesses 146 and the annular groove 158 is not controlled open yet.

Such opening only takes place after the main poppet 72 has performed an opening displacement corresponding to the quantity Z, whereby the radial shoulder 132 enters into contact with the control spring 130. I.e., the subsequent opening control of the main poppet 72 takes place against the force of the stronger control spring 130 which is designed to have a comparatively high spring constant. Opening control of the connection between the work port B and the tank port via the recess 146 and the annular groove 148 thus substantially takes place in dependence on the control spring 130 which is adapted in the best possible manner to this control task. During this drain control the radially projecting contact portion 142 permanently provides for continuing sealing contact of the main poppet 72 at the topping piston 92, so that drain control may be performed in the desired manner.

By this variant it is possible to substantially increase operating safety in comparison with the embodiment described in connection with FIG. 2, so that even under least favorable operating conditions a reliable drain control may be performed.

The construction of the valve assembly in accordance with the invention makes it possible to design a multiplicity of variants comprising the same valve housing 2 because the essential functional elements are all realised in cartridge design, without necessitating any modifications of the passages, ports etc.

What is disclose are a check valve assembly and a valve assembly employing a check valve assembly wherein a topping piston may be taken into contact with a main poppet to raise the latter from its seat. The main poppet is designed without any area difference and the topping piston is actuated through a pilot valve, so that the process of raising the main poppet from the valve seat is controllable.

The design of the check valve assembly according to the invention permits control of supply and drain throttling for the user. Herein the supply and drain throttling for motor and cylinder operation may be adjusted differently. By preventing (deactivating) drain throttling it is possible to about cut the throttle loss at the valve to about half. To this end, initially a control pressure difference is generated at the spool of the directional control valve, and subsequently both control pressures are raised by corresponding actuation of the pilot valve while retaining the pressure difference (at the spool). Herein the spool remains in its pre-set position, and the drain cut-off valve (check valve assembly 6 or 8) is controlled entirely open. Generation of the pressure difference and concurrent increase of the control pressures is advantageously triggered by actuation of a lever or switch and controlled by an associated electrical control unit.

What is claimed is:

1. A check valve assembly in a poppet valve design comprising a main poppet designed to include a pilot hole and biased against a valve seat, which may be raised from said valve seat so as to control open an open cross-section determined by a ring gap between the valve seat and the outer diameter of said main poppet, wherein a pilot hole closing body of said main poppet may be taken into its open position by means of a topping piston, wherein said topping piston may be taken into contact with said main poppet for the purpose of release, so that the opening stroke thereof is determined by the stroke of said topping piston, and wherein the diameter of the valve seat is about equal to the diameter of the main poppet on the seat side, so that the differential area effective in the opening direction is minimum at the raised main poppet.

2. A check valve assembly according to claim 1, wherein said main poppet is biased against the valve seat by a check spring having associated to it a control spring, which, following a predetermined opening stroke of the main poppet, enters into effective engagement with the main poppet, the spring constant of said control spring being greater than the spring constant of said check spring.

3. A check valve assembly according to claim 2, wherein an end of said control spring is supported against a housing-side spring retainer, an internal annular surface of said main poppet is associated with said supported end of the control spring and, following a predetermined stroke of said main poppet, the main poppet enters into contact with said control spring.

4. A check valve assembly according claim 1, wherein a connecting bore of said topping piston may be controlled open during the stroke of said topping piston so as to establish a connection of said pilot hole with a tank port.

5. A check valve assembly according to claim 4, wherein said main poppet includes, at a poppet piston side end portion thereof a hub-shaped projection having an inner end surface forming a hub bore into which said pilot hole opens, and having an annular end surface, which is a sealing contact surface for said topping piston, a tappet of which plunges into the hub bore.

6. A check valve assembly according to claim 5, wherein the inner diameter of said annular end surface is at least equal to the diameter of a main poppet seat.

7. A check valve assembly according to claim 6, wherein main poppet seat is formed at a bush having an outer diameter which is greater than the outer diameter of said annular end surface.

8. A check valve assembly according to claim 5 wherein said connecting bore opens into the hub bore of said projection.

9. A check valve assembly according to claim 5, wherein said topping piston is biased against a stop by a spring in such a way that a gap between the contact surface of said main poppet and the adjacent end surface of said topping piston is greater than the distance between said tappet and the outer circumference of said pilot hole closing body.

10. A check valve assembly according to claim 1, wherein said topping piston at the outer circumference thereof includes several recesses distributed over the circumference, through which a chamber downstream from the main poppet seat may be connected to a tank passage upon actuation of said topping piston.

11. A check valve assembly according to claim 1, wherein said topping piston is controlled hydraulically.

12. A valve assembly including a directional control valve through which a pump port is connected with a work conduit leading to a user, in which work conduit a check valve assembly including a main poppet and a topping piston in accordance with claim 1 is arranged.

13. A valve assembly according to claim 12, wherein said topping piston is piloted by an electrically actuated pilot valve.

14. A valve assembly according to claim 12, wherein the directional control valve is a continuously adjustable directional control valve including a variable metering orifice which is followed downstream by an individual pressure compensator.

15. A valve assembly according to claim 12, wherein the work conduit is connected to a tank port.

16. valve assembly according to claim 15, wherein a check valve is arranged in a connecting conduit between said tank port and a work port.

17. A valve assembly for actuation of a double-action user, comprising a directional control valve that includes two outlet ports, each of which is associated with a check valve assembly according to claim 1, wherein each topping piston of each check valve assembly may be actuated through the intermediary of a pilot valves, the output pressure of which is guided via a control passage to an end surface of the spool of said directional control valve, so that the directional control valve may be taken into a position such that one of two work ports is connected to a pump port, and the other work port may be connected to a tank via the check valve assembly receiving the same control pressure as said directional control valve spool.

18. A valve assembly according to claim 17, wherein the pilot valve is a pressure reducing valve in cartridge design.

19. A valve assembly according to claim 17, wherein a check valve is arranged in a connecting conduit between said tank port and said work port.

20. A valve assembly according to claim 17, wherein the pilot valve is a pressure reducing valve in a cartridge design.

* * * * *